United States Patent [19]

Gebhardt et al.

[11] 4,256,784

[45] Mar. 17, 1981

[54] HEAT-SEALABLE PLASTIC FILM

[75] Inventors: Dieter Gebhardt; Siegfried Janocha, both of Wiesbaden-Biebrich, Fed. Rep. of Germany

[73] Assignee: Hoechst Aktiengesellschaft, Frankfurt am Main, Fed. Rep. of Germany

[21] Appl. No.: 826,769

[22] Filed: Aug. 22, 1977

[30] Foreign Application Priority Data

Aug. 24, 1976 [DE] Fed. Rep. of Germany ....... 2637978

[51] Int. Cl.$^3$ .................... B32B 27/08; B32B 7/02
[52] U.S. Cl. .................... 428/216; 428/515; 428/516; 428/523; 428/215; 526/348.6
[58] Field of Search ............ 428/515, 516, 523, 215, 428/216; 526/348.6

[56] References Cited

U.S. PATENT DOCUMENTS

| 3,491,935 | 1/1970 | Trotter et al. | 428/515 |
| 3,671,383 | 11/1968 | Sakata et al. | 428/516 |
| 3,891,008 | 6/1975 | D'Entremont | 428/516 |
| 3,920,621 | 11/1975 | Baxmann et al. | 526/348.6 |
| 3,959,409 | 5/1976 | Frese et al. | 526/348.6 |
| 3,981,849 | 9/1976 | Frese et al. | 526/348.6 |
| 4,022,646 | 5/1977 | Casey | 428/516 |
| 4,072,813 | 2/1978 | McConnell et al. | 526/348.6 |

FOREIGN PATENT DOCUMENTS 1452424 10/1976 United Kingdom .

Primary Examiner—George F. Lesmes
Assistant Examiner—E. Rollins Buffalow
Attorney, Agent, or Firm—Schwartz, Jeffery, Schwaab, Mack, Blumenthal & Koch

[57] ABSTRACT

Disclosed is a heat-sealable film comprising a base film of a polymer or copolymer of an α-olefin having from 2 to 6 carbon atoms in the molecule and applied to at least one surface of the base film, a heat-sealable interpolymer layer comprising a terpolymer comprised of from about:

93.2–99.0 percent by weight of propylene units,
0.5–1.9 percent by weight of ethylene units, and
0.5–4.9 percent by weight of units of an α-olefin having from 4 to 10 carbon atoms in the molecule, and in which the comonomers are substantially statistically distributed.

Also disclosed are a method for producing this film and a packaging method utilizing the film.

16 Claims, 2 Drawing Figures

HEAT-SEALABLE PLASTIC FILM

BACKGROUND OF THE INVENTION

The present invention relates to heat-sealable thermoplastic films, and especially to oriented thermoplastic films which have at least one heat-sealable layer comprising a terpolymer and which are distinguished from prior art films by improved qualities as regards transparency, surface hardness, and heat-sealability.

For many applications, e.g., for packaging foodstuffs, the industry demands films which have a low turbidity, preferably a high tensile strength in the longitudinal and/or transverse direction(s), low heat-sealing temperatures combined with a high heat-sealing strength, as well as a reduced permeability to gases and/or vapors.

Such a combination of desirable properties cannot be achieved by monofilms e.g., polyethylene, polypropylene, or polyester films.

Polypropylene or polyester films oriented by stretching, normally biaxial stretching by the known sheet stretching or tubular stretching processes, do have the desirable physical parameters as regards strength, viz., tensile strength, tear resistance, etc., as well as scratch resistance and low turbidity, but due to their high degree of orientation and crystallinity, caused by stretching, the stretched films are no longer capable of being heat-sealed.

Therefore, it has been suggested to provide thermoplastic films with a heat-sealable layer which may be applied to the support, e.g., from a solution or a dispersion by melt coating or by lamination.

From the great variety of known measures and techniques which are generally known to the man skilled in the art and need not be discussed in detail here, only German Auslegeschrift No. 1,184,071 shall be mentioned.

This published patent application discloses a process for the manufacture of an oriented, heat-sealable polypropylene film wherein a heat-sealable layer is applied to a polypropylene film base, either from a solution or dispersion, as in the case of polyvinylidene copolymers, or as a melt, as in the case of high-pressure polyethylene. Although such films are satisfactory as far as the desired strength and heat-sealing strength are concerned, they have the drawback that their turbidity is too high and that they are too sensitive to scratching. Such films may be used for some applications, where the additional qualities mentioned are of no importance, but they are unsuitable as packaging films, especially if hard goods, such as rice, noodles, potato chips, nuts and the like are to be packed, and these films will not be accepted by the industry.

From German Offenlegungsschrift No. 1,694,694, a heat-sealable laminate is known which consists of an oriented polypropylene film provided with at least one heat-sealable layer composed of a copolymer of 2 to 6 percent by weight of ethylene and 98 to 94 percent by weight of propylene. The above-mentioned drawbacks are avoided by this laminate. This composite film has a better heat-sealability than the above disclosed film, but it is not as clear and resistant to scratching as would be desirable. For this reason, this film is not particularly suitable for use on modern, vertical-type molding, filling and packaging machines, because the film surface will be scratched even during packaging by the goods to be filled in and also by the machine itself, e.g., when the film is drawn over the molding shoulders. Therefore, as a result of this fact, in combination with the inherent turbidity of the film, the package does not present the degree of optical clarity preferred by the user.

German Offenlegungsschrift No. 2,460,597 discloses a multilayer film which comprises an α-olefin substrate which is provided on at least one surface with a heat-sealable layer of a copolymer of polypropylene and an α-olefin with 4 to 10 carbon atoms in the molecule. The proportion of α-olefin in the heat-sealable layer is between 5 and 20 percent by weight. By incorporating such a high proportion of a comonomer (the preferred range being 10 to 15 percent by weight of 1-butene) the scratch resistance of the laminate is said to be improved over that of other films, e.g., films with other heat-sealable layers, and its adhesion to the sealing jaws is said to be reduced. On the other hand, the temperature at which the material begins to be heat-sealable is raised in an undesirable manner, which means that its heat-sealing range is narrowed. Such a restriction of the heat-sealing range will not be tolerated by the user, however, because he prefers to operate at sealing temperatures which are as low as possible, i.e., with as little shrinkage of the film as possible and with a minimum expenditure of energy. Furthermore, despite a high comonomer proportion, the necessary strength of the heat-sealing bond is frequently not achieved when lower temperatures within the sealing range are applied. Moreover, the resulting film is too turbid.

SUMMARY OF THE INVENTION

It is therefore an object of the present invention to provide an improved heat-sealable film, in particular a multiple-layer film. It is a particular object of the present invention to provide a heat-sealable plastic film which combines the advantages of low turbidity and improved scratch resistance with those of a good heat-sealing strength and wide heat-sealing range which begins at a relatively low temperature.

A further object of the invention resides in the provision of a method for manufacturing the improved film according to the invention.

It is also an object of the invention to provide an improved packaging method utilizing the new film of the invention.

These objects are achieved by providing according to the invention a heat-sealable plastic film comprising a base film of a polymer or copolymer of an α-olefin having from 2 to 6 carbon atoms in the molecule, and applied to at least one surface of the base film, a heat-sealable copolymer layer, which is characterized in that the heat-sealable layer comprises a terpolymer which is comprised of from about:

93.2–99.0 percent by weight of propylene units,
0.5–1.9 percent by weight of ethylene units, and
0.5–4.9 percent by weight of units of an α-olefin having from 4 to 10 carbon atoms in the molecule, and in which the comonomers are substantially statistically (randomly) distributed.

In another aspect of the invention, there has been provided a process for the preparation of the above-defined film comprising the steps of co-extruding the base film and the heat-sealable terpolymer layer to produce a co-extruded laminate and then cooling the resulting laminate. Preferably, both surfaces of the base film are coated and the heat-sealable layers applied by extrusion differ in their thickness and/or in their composition. In the most preferred aspect of the process, the film is heated to its stretching temperature after extrusion and cooling, and stretched in at least one direction, and is then heat-set.

According to still another aspect of the invention, there has been provided a packaging method, comprising the steps of wrapping an article in the film as defined by claim 1 and heat-sealing one heat-sealable surface of said film.

Further features, objects and advantages of the present invention will become apparent from the detailed description of preferred embodiments which follows, when considered together with the attached figures of drawing.

DETAILED DESCRIPTION OF THE PREFERRED EMBODIMENTS

Figure 1:
FIG. 1 is a side elevational view, in section, of a film according to the present invention having only one heat-sealable surface layer.

Compared with films carrying heat-sealable layers containing copolymers of propylene and ethylene or propylene and 1-butene, the film according to the present invention is distinguished in that it, surprisingly, has a substantially lower turbidity and, at the same time, a higher surface hardness. Also, the manufacturing temperatures of the terpolymer and the processing temperatures, e.g., the heat-sealing temperature, of the film are lowered in an advantageous manner, as compared with those of pure polypropylene films. In addition, the heat-sealing strength within the normal sealing range is increased.

Thus, the film according to the invention may be used with considerable advantage, e.g., in the packaging industry, where low turbidity and lower sealing temperatures are of primary importance. At the same time, the film has the advantage of a better scratch resistance. This property is of particular importance if hard goods, such as noodles, rice, potato chips and the like are to be packed, because it substantially prevents bags made of films according to the invention from becoming opaque by scratching during filling and shipping.

The melting temperature of the terpolymer used is lower by at least about 10° C. than that of, e.g., polypropylene, and its RSV (reduced specific viscosity) value is within the range from about 1.5 to 15, preferably between about 2 and 10 dl/g, with favorable processing temperatures being the result.

The RSV values are measured as a 0.1 percent by weight solution of the terpolymer in decahydronaphthalene at 135° C.

Due to their preponderantly crystalline character, the films according to the present invention have substantially the same good mechanical properties as films of, e.g., polypropylene. The films may be manufactured by the methods normally used for α-olefin films, e.g., polypropylene films, either in the form of flat sheets or in tubular form.

Except that dosing devices for the comonomers will additionally be necessary, the terpolymers used according to the present invention as heat-sealable layers may be prepared in the same polymerization facilities which are also used for isotactic propylene homopolymers. Conventional highly stereospecific catalyst systems may be used for the preparation of the terpolymers, e.g., a combination of aluminum diethyl monochloride, as the activator, with a $TiCl_3$-containing component which is obtained by reducing $TiCl_4$ with aluminum, aluminum diethyl chloride, or aluminum ethyl sesquichloride and then subjecting it to a thermal after-treatment. Alternatively, a $TiCl_3$ component may be used which has been after-treated with complex-forming compounds, or the stereospecific effect of the catalyst may be increased by the addition of so-called third components to the polymerizing mixture, or the two measures may be combined with each other (see German Offenlegungsschriften Nos. 1,495,629, 2,409,726, and 2,413,216) the disclosures of which are hereby incorporated by reference. Other $TiCl_3$ components, e.g., a commercially available catalyst of the composition $TiCl_3.\frac{1}{3}AlCl_3$, may also be used, either alone or in combination with complex formers, to increase the stereospecific effect, provided they form a highly stereospecific catalyst system in combination with the above-mentioned activator.

The terpolymers are prepared in an inert diluent or in a gaseous phase. Suitable diluents are, e.g.: aliphatic or cycloaliphatic hydrocarbons, such as pentane, hexane, heptane, cyclohexane, or methyl cyclohexane. Further, aromatic hydrocarbons may be used, e.g., benzene or xylene, or gasoline fractions or hydrogenated diesel oil fractions carefully freed from oxygen, sulfur compounds and moisture.

The concentration of the catalyst and the temperature and pressure conditions are the same as normally used for the homopolymerization of propylene with the same catalysts. Preferably, pressures between about 0.5 and 40 $kp/cm^2$ and temperatures between about 40° and 90° C. are applied.

Preferably, the heat-sealable layer contains 1-butene or 1-hexene as the α-olefin, because these monomers lend themselves very readily to a statistical (random) incorporation into the terpolymer chain. Although 1-butene and 1-hexene are the preferred comonomers, 1-pentene, 1-heptene and 1-decene are also suitable as comonomers to be incorporated into the terpolymer.

The thickness of the heat-sealable layer is not limited, but thin layers are preferred. As a rule, the thickness of the layer is in the range from about 0.3 to 3.5 μm, with thicknesses between about 1 and 2 μm being preferred.

The heat-sealable layer according to the invention may be applied to one or both surfaces of the base film. If both surfaces are coated, the two heat-sealable layers may differ in thickness and/or composition, depending on the purpose for which the film is intended. Further, it is possible for one of the heat-sealable layers applied to be the terpolymer layer according to the invention, whereas the other heat-sealable layer may consist of a conventional polymer, e.g., a copolymer of propylene and ethylene, polyvinylidene chloride, or a copolymer of vinylidene chloride. Furthermore, a base film carrying heat-sealable layers on both surfaces may be further coated on one surface with, e.g., a polyvinylidene chloride layer, which may be of advantage for some applications.

The structure of the film may be such that the base film is not oriented. This is quite satisfactory for some purposes, where the strength of the film is of no importance. Preferably, however, the base film is oriented by stretching, thus imparting to it the mechanical properties required and desired for many purposes. Depending on the direction in which the finished film will be stressed, the base film may be monoaxially stretched in the longitudinal or transverse direction. Preferably, however, the film is biaxially stretched in the longitudinal and in the transverse direction, the stretching rates ranging from about 3 to 12, preferably from about 4 to 8. If the multi-layer film is manufactured by co-extrusion, the top layer will also be oriented according to the stretching direction. The stretched or unstretched heat-sealable film may be used, e.g., as a high-shrinkage film (10 to 20 percent shrinkage) for the shrink-wrapping of products, e.g., foodstuffs. If a lower shrinkage is desired, the base film preferably is heat-set, thus reducing the shrinking tendency. The shrinkage of such films is generally in the range from about 2 to 8 percent.

The film according to the present invention is used with particular advantage on molding, filling, closing, and wrapping machines. The film according to the present invention may be manufactured and used in sheet form or in tubular form. Preferably, however, it is used in sheet form.

The base film generally comprises a polymer or copolymer of an α-olefin with 2 to 6 carbon atoms in the molecule. Suitable polymers for the base film are, above all, polypropylene or copolymers of propylene with, e.g., ethylene, 1-butene, or 1-hexene, such as are known from German Offenlegungsschrift No. 1,936,963, where, e.g., a copolymer containing up to 10 percent by weight of co-monomer (ethylene) is disclosed.

The thickness of the base film is not restricted, but normally films with a thickness between about 8 and 100 μm, preferably between about 20 and 45 μm, are preferred in practice.

The heat-sealable layer and/or the base film may contain additives, provided they do not to any significant extent impair the transparency, resistance to scratching, and heat-sealing strength of the film. Suitable additives are, e.g., slip promoters, antistatic agents, dye-stuffs, anti-oxidants, and the like.

The invention relates also to a process for the manufacture of the heat-sealable film. The heat-sealable layer according to the invention may be extruded onto one or both surfaces of a pre-fabricated base film which may be either unstretched or stretched in one or both directions. Alternatively, the heat-sealable layer may be extruded as a self-supporting film, which is then laminated to one or both surfaces of the prefabricated unstretched, or monoaxially or biaxially stretched base film with the aid of pressure and heat. In addition, a combination of melt-coating one surface and laminating the other surface of the base film may be possible, in which case an oxidizing treatment, e.g., a corona treatment, of the base film and/or the heat-sealable film may be advisable in order to improve the cohesion between the layers.

Preferably, however, the film according to the present invention is manufactured by a co-extrusion process which is conventional in the art. Films with coatings on both surfaces may be manufactured in one operation by co-extrusion, so that this method is preferred. See, e.g., U.S. Pat. No. 3,833,704.

As a further modification of the present process, especially the co-extrusion process, the coated and cooled, but not yet stretched film is heated to the stretching temperature within the range of from about 115° to 180° C. and is then stretched in one or both directions. For this purpose, the flat sheet stretching processes and tubular stretching processes known to the man skilled in the art are applied, the stretching rates ranging from about 3 to 12. Biaxial stretching is preferred, and for special purposes a heat-setting step at about 120° to 170° may be added to fix the degree of orientation. The already stretched films may be after-stretched in the longitudinal and/or transverse direction, with certain desirable mechanical properties in one or the other direction being thus obtained.

Although the film according to the present invention is not restricted to any particular applications, it is preferably used in the packaging field as a transparent, scratch-resistant film which may be heat-sealed at relatively low temperatures and produces heat-sealing seams of high strength, because a combination of these properties is of particular importance in this field.

The invention will be illustrated by the following selected examples, but it is not intended to restrict it to the embodiments disclosed in these examples. The results of the examples are shown in the table.

The differences between the values of the two prior art multilayer films, mentioned above, and those of the film according to the present invention will become obvious from the table below, which clearly shows the advantages of the present invention.

EXAMPLE 1

Isotactic polypropylene with a density of 0.910 g/cm$^3$ and a melt index of 7 g/10 min ($i_5$ value: 230° C., 5 kp) is extruded as the middle layer from a slot die with three orifices. At the same time, outer layers of a substantially statistical (random) terpolymer composed of 97.0 percent by weight of propylene units, 1.0 percent by weight of ethylene units, and 2.0 percent by weight of 1-butene units are co-extruded at an extrusion temperature of 270° C. The three-layer melt is cooled on a casting drum maintained at 30° C., then heated to a temperature of 125° C., and conveyed to a stretching roller heated to 130° C. The stretching gap between stretching rollers rotating at different speeds is 28 mm long. The longitudinal stretching rate is 5.6. After cooling to 30° C., the three-layered film is introduced into a heated tenter, clamped in clips, and stretched at a temperature of 155° C. The transverse stretching rate is adjusted to 8.3.

The flat sheet of biaxially stretched film thus obtained is heat-set in a heat-setting frame at 165° C., cooled, and then wound up. In the finished film, the base film is 20 μm thick and each of the heat-sealable terpolymer layers has a thickness of 1.3 μm.

The terpolymer has been produced as follows:

100 Liters of a hydrated aliphatic hydrocarbon with a boiling range between 140° and 170° C. are filled into a 150 liter vessel lined with an enamel coating and provided with an impeller, heated to 58° C., and saturated with the monomer at a propylene pressure of 0.5 bar. After adding 0.5 mole of aluminum diethyl monochloride (=5 millimoles per liter) and 0.5 millimoles per liter of TiCl$_3$-containing catalyst, polymerization starts at once.

35.737 kg of propylene, 0.368 kg of ethylene, and 0.737 kg of 1-butene are introduced in the course of 7 hours. The molecular weight of the terpolymer is controlled by adding 2.5 liters of hydrogen per hour. After all the monomers have been added, the contents of the vessel is allowed to react for another 30 minutes. The slight excess pressure still prevailing in the vessel is then released.

The components of the catalyst are decomposed during 4 hours at 70° C. with 3 liters of i-propanol. The organic phase is extracted four times with 30 liters of desalted water. Finally, the polymer suspension is filtered at a temperature between 50° and 65° C. and the resulting polymer is dried. The RSV value of the polymer is 2.85 dl/g.

EXAMPLE 2

The procedure is the same as in Example 1, except that the terpolymer is composed of 95.3 percent by weight of propylene units, 1.7 percent by weight of ethylene units, and 3.0 percent by weight of 1-butene units.

The RSV value of the terpolymer was 3.0 dl/g.

EXAMPLE 3

The procedure is the same as in Example 1, except that the terpolymer is composed of 95.1 percent by weight of propylene units, 1.8 percent by weight of ethylene units, and 3.1 percent by weight of 1-butene units.

The RSV value of the terpolymer was 3.15 dl/g.

EXAMPLE 4

The procedure is the same as in Example 1, except that the terpolymer is composed of 93.8 percent by weight of propylene units, 1.8 percent by weight of ethylene units, and 4.4 percent by weight of 1-butene units.

The RSV value of the terpolymer was 3.3 dl/g.

EXAMPLE 5

The procedure is the same as in Example 1, except that the terpolymer is composed of 93.7 percent by weight of propylene units, 1.8 percent by weight of ethylene units, and 4.5 percent by weight of 1-hexene units.

The RSV value of the terpolymer was 3.5 dl/g.

EXAMPLES 6 AND 7

The same polymers are used as in Examples 1 and 5, but a double-slotted tubular die is used for the manufacture of a two-layer film, the terpolymer layer forming the inside wall of the resulting tube. The extrusion temperature is 245° C. By means of a first pair of squeeze rollers rotating at a speed higher than the extrusion speed, the extruded double melt is drawn over a cooling mandrel disposed in a cooling bath maintained at a temperature of 30° C. By means of an air injector passing through the cooling mandrel, the tube is inflated between the first and the second pairs of squeeze rollers to 4.3 times its original diameter and simultaneously heated to 125° C. The longitudinal stretching rate, determined by the difference in speed between the first and the second pairs of squeeze rollers, is adjusted to 6.0. The film is then fixed at 160° C. in a heat-setting zone, cooled, and finally wound up.

The polypropylene layer is 25 μm thick, whereas the terpolymer layer has a thickness of 2.0 μm.

EXAMPLE 8

Example 1 is repeated, except that a copolymer known from the prior art is used, which consists of 97.0 percent by weight of propylene units and 3.0 percent by weight of ethylene units.

The RSV value was 2.66 dl/g.

EXAMPLE 9

Example 1 is repeated, except that a copolymer known from the prior art is used which consists of 89.0 percent by weight of propylene units and 11.0 percent by weight of 1-butene units.

The RSV value was 3.45 dl/g.

Best results have so far been reached with films having a polypropylene base layer and one or two layers made from terpolymers having RSV values in the range from 2.8 to 3.5 dl/g, especially by the method described in Example 1.

The following table contains a survey of values obtained, as compared with prior art films.

TABLE

| Example | Composition of the Terpolymer (percent by weight) | | | | Values for the Heat Sealing Strength (N/20 mm) at the following temperatures (°C.) | | | | | | Turbidity | Scratch resistance compared with that of a biaxially stretched, uncoated polypropylene film prepared according to the process parameters of Ex. 1, which serves as the factor 1 |
|---|---|---|---|---|---|---|---|---|---|---|---|---|
| | $C_2$ | $C_3$ | $C_4$ | $C_6$ | 110 | 120 | 125 | 130 | 135 | 140 | | |
| 1 | 1.0 | 97 | 2.0 | — | — | — | 0.1 | 0.35 | 1.25 | 2.05 | 32 | 1.2 |
| 2 | 1.7 | 95.3 | 3.0 | — | — | 0.15 | 0.3 | 0.7 | 1.6 | 2.05 | 34 | 1.3 |
| 3 | 1.8 | 95.1 | 3.1 | — | — | 0.4 | 0.65 | 1.6 | 2.0 | 2.3 | 37 | 1.35 |
| 4 | 1.8 | 93.8 | 4.4 | — | 0.2 | 0.6 | 1.1 | 1.7 | 2.2 | 2.5 | 40 | 1.4 |
| 5 | 1.8 | 93.7 | — | 4.5 | — | 0.2 | 0.3 | 0.6 | 1.4 | 2.1 | 38 | 1.45 |
| 6 | 1.0 | 97 | 2.0 | — | — | — | 0.15 | 0.38 | 1.30 | 2.1 | 31 | 1.2 |
| 7 | 1.8 | 93.7 | — | 4.5 | — | 0.2 | 0.3 | 0.65 | 1.45 | 2.15 | 38 | 1.4 |
| 8 | 3.0 | 97.0 | — | — | — | — | — | 0.25 | 1.0 | 1.8 | 55 | 1.9 |
| 9 | — | 89.0 | 11.0 | — | — | — | — | 0.15 | 1.04 | 1.9 | 52 | 1.95 |

As can be seen from the table, the terpolymer layers according to the present invention yield generally better values as regards a reduction of turbidity, good scratch resistance, earlier onset of heat-sealing, wider range of heat-sealing temperature, and higher sealing strength, when compared with heat-sealable films carrying layers of propylene/ethylene or propylene/1-butene copolymers.

The values listed in the table are determined as follows:

1. The turbidity is measured according to ASTM-D 1003-52, the values stated being percentages calculated from four super-imposed layers of film. These four layers are selected because in this manner the optimum measuring range is reached.

2. The scratch resistance is determined in accordance with ASTM-D 073-44.

3. For determining the heat-sealing strength, a heat-sealing device of type HSG-ET, marketed by Messrs. Brugger, is used. The films are sealed at the temperatures stated in the table between smooth, heated sealing jaws at a pressure of 300 kPa and for a duration of 0.5 sec. Test strips 20 mm wide are cut from the heat-sealed films and the strength of the seam is determined by separating the strips in a pull test machine of conventional design at a separating speed of 100%/min. (T-peel). The values found for the sealing strength are stated in N/20 mm.

Similar results are obtained when the heat sealable terpolymer layers are extruded onto already stretched base films or laminated to such films. Correspondingly good results are also achieved when using a propylene copolymer containing up to 10 percent by weight of ethylene or up to 30 percent by weight of 1-butene or 1-hexene as the base film, both co-extrusion and melt coating techniques being possible.

Figure 2:
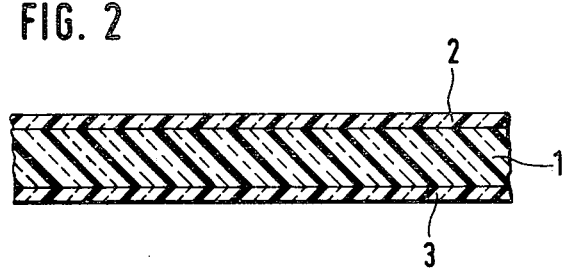
FIG. 2 is a similar view of a film according to the invention having both sides covered with a heat-sealable surface layer.

The attached FIGS. 1 and 2 show, in section, side elevations of two films according to the invention, the base film being designated as 1 and the heat-sealable layers being numbered 2 and 3.

What is claimed is:

1. A heat-sealable film, comprising a base film of a polymer or copolymer of an α-olefin having from 2 to 6 carbon atoms in the molecule and applied to at least one surface of the base film, a heat-sealable interpolymer layer comprising a terpolymer comprised of from about
    93.2–99.0 percent by weight of propylene units,
    0.5–1.9 percent by weight of ethylene units, and
    0.5–4.9 percent by weight of units of an α-olefin having from 4 to 10 carbon atoms in the molecule,
and in which the comonomers are substantially statistically randomly distributed.

2. The film according to claim 1, wherein said α-olefin in the heat-sealable layer comprises 1-butene or 1-hexene.

3. The film according to claim 1, wherein prior to the formation of the heat-sealable layer, the terpolymer has an RSV value of from about 1.5 to 15.0 dl/g.

4. The film according to claim 3, wherein prior to the formation of the heat-sealable layer, the terpolymer has an RSV value of from about 2.0 and 10.0 dl/g.

5. The film according to claim 1, wherein the thickness of the heat-sealable layer is in the range from about 0.5 to 3.5 μm.

6. The film according to claim 5, wherein the thickness of the heat-sealable layer is in the range from about 1.0 and 2.0 μm.

7. The film according to claim 1, wherein the base film is stretched in at least one direction.

8. The film according to claim 7, wherein the base film is heat-set.

9. The film according to claim 1, wherein said film is in flat sheet form.

10. The film according to claim 1, wherein the base film has a thickness in the range from about 8 to 100 μm.

11. The film according to claim 1, wherein the base film has a thickness in the range from about 20 and 45 μm.

12. The film according to claim 1, wherein the base film comprises polypropylene or a propylene copolymer.

13. The film according to claim 1, wherein the heat-sealable layer and/or the base film further comprises an additive selected from antistatic agents, slip promotors, anti-oxidants, and dyestuffs.

14. The film according to claim 1, wherein both surfaces of the base film are coated with the heat-sealable layer and wherein said layers applied to the two surfaces differ.

15. The film according to claim 14, wherein said surface layers differ in thickness.

16. The film according to claim 14, wherein said surface layers differ in terpolymer composition.

* * * * *